(12) United States Patent
Tseng

(10) Patent No.: US 6,967,460 B1
(45) Date of Patent: Nov. 22, 2005

(54) ERROR-CORRECTION APPARATUS FOR STEP-MOTOR TRANSMISSION SYSTEM AND A METHOD FOR THE SAME

(75) Inventor: Ching-Tung Tseng, Taipei (TW)

(73) Assignee: Service & Quality Technology Co., Ltd., Taipei (TW)

( * ) Notice: Subject to any disclaimer, the term of this patent is extended or adjusted under 35 U.S.C. 154(b) by 0 days.

(21) Appl. No.: 10/896,077

(22) Filed: Jul. 22, 2004

(51) Int. Cl.[7] ............................................... H02P 8/12
(52) U.S. Cl. ..................................... 318/685; 318/632
(58) Field of Search .......................... 318/632, 685, 318/696, 162; 388/904

(56) References Cited

U.S. PATENT DOCUMENTS

| | | | |
|---|---|---|---|
| 4,706,008 A * | 11/1987 | Cronch et al. .............. | 318/696 |
| 5,084,661 A * | 1/1992 | Tanaka ....................... | 318/685 |
| 5,291,111 A * | 3/1994 | Hirano ........................ | 318/563 |
| 5,711,507 A * | 1/1998 | Berget et al. .......... | 251/129.04 |
| 5,770,937 A * | 6/1998 | Tsuda et al. ................. | 318/685 |

* cited by examiner

Primary Examiner—Bentsu Ro
(74) Attorney, Agent, or Firm—Rosenberg, Klein & Lee

(57) ABSTRACT

An error-correction method and apparatus are used for a step motor transmission system. The step motor has a plurality of inductor coils therein for rotating an internal shaft thereof. A rotational error gamma table is established by measuring an error value for each rotational step of the step motor. The error-correction apparatus receives an external digital displacement signal for producing a rotational step signal. A compensation current is produced according to the rotational step signal and an error value in the rotational error gamma table. The inductor coils are driven by the compensation current to rotate the internal shaft precisely.

12 Claims, 4 Drawing Sheets

ERROR-CORRECTION APPARATUS FOR STEP-MOTOR TRANSMISSION SYSTEM AND A METHOD FOR THE SAME

BACKGROUND OF THE INVENTION

1. Field of the Invention

The present invention relates to an error-correction apparatus for a step motor transmission system and a method for the same, and especially to an error-correction apparatus for correcting step error in a step motor-transmission system and a method for the same.

2. Description of Prior Art

The digital electronic products are prevalent in modern ordinary life. Among them, the high-end digital still camera and scanner have been developed to use a step motor to enhance image quality. More particularly, the transmission system of a step motor is under intense research to provide precise control.

The step motor comprises a plurality of precise inductor coils to control precise rotation of internal shaft in the step motor. Therefore, the step motor can provide precise moving displacement. Taking a high-end scanner as an example, the image quality thereof depends not only on a CMOS sensor thereof but also on the precise displacement pitch provided by the step motor.

FIG. 1 shows a driving circuit for a conventional 2-phase step motor 10. The step motor 10 comprises two sets of inductor coils 11 connected to two sets of driving circuits 12, a digital-to-analog converter (DAC) 13 and a processor 14. The processor 14 sends a digital displacement signal to the DAC 13 and the DAC 13 converts the digital displacement signal into two sets of control currents for sending to the two sets of driving circuit 12, respectively. The inductor coils 11 are driven by the control currents to generate magnetic excitation for rotating the internal shaft in the step motor.

However, the high-end step motor 10 generally is expensive and the transmission system thereof still has a certain amount of error, which results from fabrication error in the f inductor coil 11. A time-consuming post-correction is thus needed.

SUMMARY OF THE INVENTION

It is the object of the present invention to provide an error-correction apparatus for a step motor transmission system and a method for the same, in which a rotational error gamma table is provided for an ordinary step motor and the error-correction apparatus produces a compensated driving current with reference to the a rotational error gamma table to enhance operation. The compensated driving current drives the coils of the step motor to enhance operational correctness of the step motor.

To achieve the above object, the present invention provides an error-correction method for a step motor with a plurality of inductor coils therein for rotating an internal shaft thereof. A rotational error gamma table is established by measuring an error value for each rotational step of the step motor. The error-correction apparatus receives an external digital displacement signal for producing a rotational step signal. A compensation current is produced according to the rotational step signal and an error value in the rotational error gamma table. The inductor coils are driven by the compensation current to rotate the internal shaft precisely.

To achieve the above object, the present invention also provides an error-correction apparatus for a step motor with a plurality of inductor coils therein for rotating an internal shaft thereof. The error-correction apparatus comprises at least one driving amplifier electrically connected to the inductor coils to rotate the internal shaft of the step motor; at least one rotational step controller receiving an external digital displacement signal and converting the external digital displacement signal to a rotational step signal for the step motor; and an error corrector electrically connected between the driving amplifier and the rotational step controller and comprising a rotational error gamma table. The error corrector receives the rotational step signal and modifies the rotational step signal according to the rotational error gamma table in order to drive the step motor transmission system by the driving amplifier.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings, in which:

DETAILED DESCRIPTION OF THE INVENTION

Figure 1:
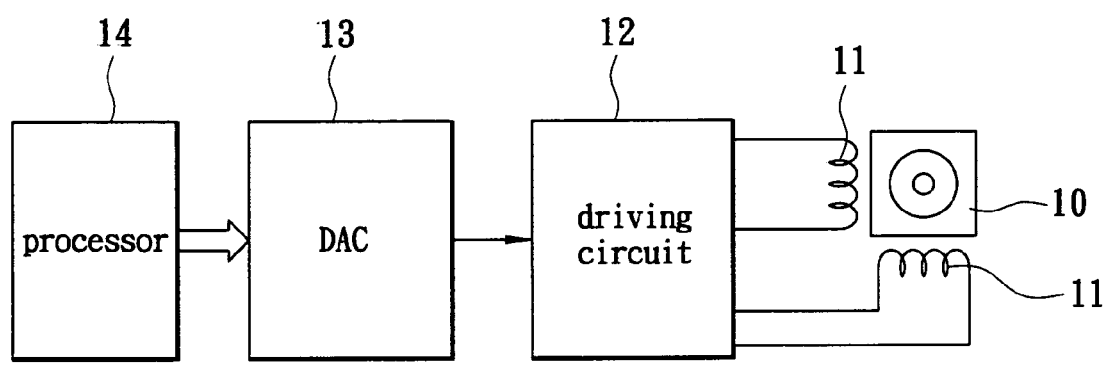
FIG. 1 shows a driving circuit for a conventional, 2-phase step motor.
Figure 2:
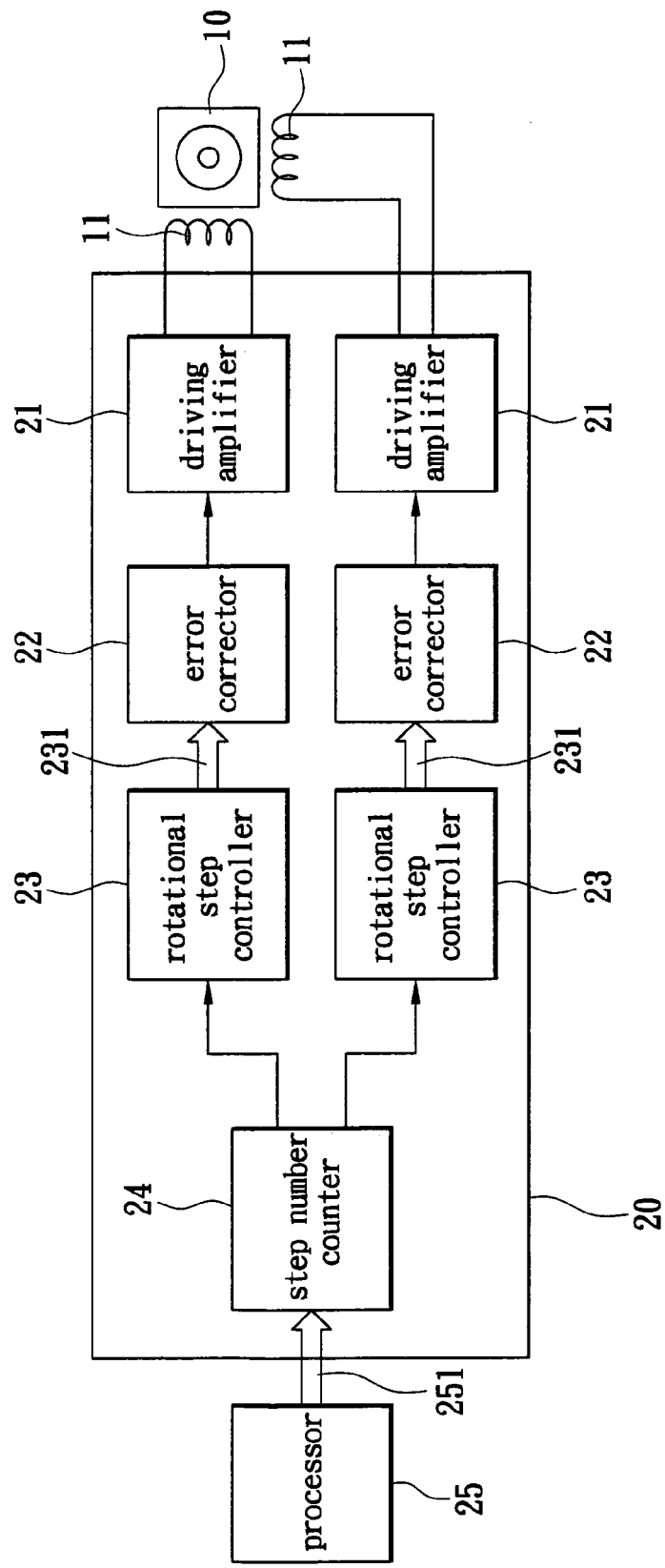
FIG. 2 shows a schematic diagram of the error-correction apparatus for a step motor.

FIG. 2 shows a schematic diagram of the error-correction apparatus for a step motor 10, in which the step motor 10 is exemplified with 2-phase step motor providing 8 steps per revolution. A high-end step motor provides more than 200 steps per revolution. It should be noted that the error-correction apparatus of the present invention could also be applied to a high-end step motor.

In the present invention, an error-correction apparatus 20 is arranged on the step motor 10. In this preferred embodiment, the step motor 10 comprises two sets of inductor coils 11 for controlling a step number of an internal shaft (not shown) of the step motor 10. The error-correction apparatus 20 comprises two sets of driving amplifiers 21, two sets of error correctors 22, two sets of rotational step controllers 23 and a step number counter 24, and receives a digital displacement signal 251 from a processor 25.

The driving amplifiers 21 are electrically connected to the two inductor coils 11 and drive the inductor coils 11 to generate magnetic excitation for rotating the internal shaft in the step motor. The rotational step controllers 23 are electrically connected to the step number counter 24, and the step number counter 24 receives the digital displacement signal 251 from the processor 25. The step number counter 24 calculates a step number from the digital displacement signal 251 and sends the step number to the rotational step controllers 23, which converts the step number into a rotational step signal 231 for the rotation of the step motor 10.

Figure 3:
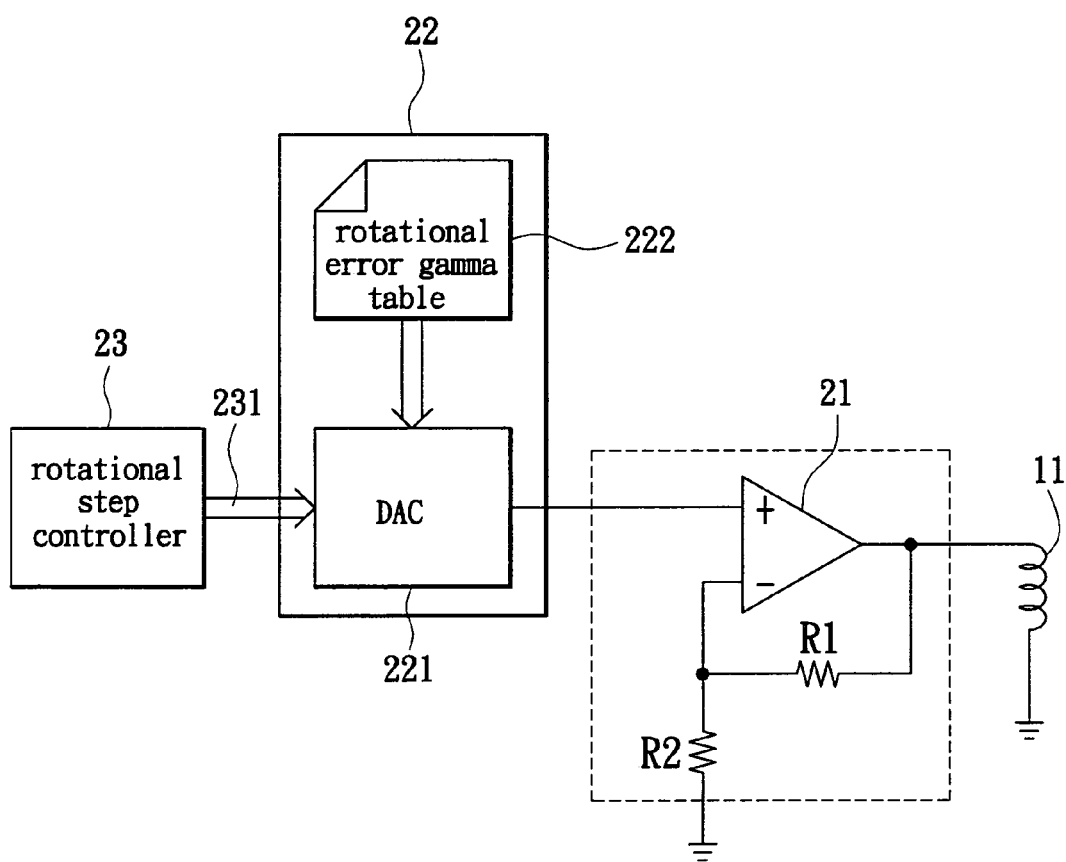
FIG. 3 shows the block diagram of the error corrector and the driving amplifier.

The error corrector 22 comprises a plurality of DAC 221 and is electrically connected between the driving amplifiers 21 and the rotational step controllers 23. FIG. 3 shows the block diagram of the error corrector 22 and the driving amplifier 21. The error corrector 22 comprises a rotational error gamma table 222, which is established by measuring each step error for the step motors 10 in the same batch.

The step motors 10 in the same batch generally have the same error value. Therefore, the error value can be determined by picking one of the step motors 10 from a batch and precisely measuring the error value. A compensation current can be calculated from the error value and applied to all step motors 10 in the same batch.

The rotational error gamma table 222 is stored in the error corrector 22 after it is established. The error corrector 22 receives the rotational step signal 231 and finds an error correction value from the rotational error gamma table 222 with reference to the rotational step signal 231. The rotational step signal 231 is compensated by the error correction value and then sent to the DAC 221 for producing compensated driving current. The compensated driving current is sent to the driving amplifiers 21 for precisely controlling the rotation of the motor 10.

Figure 4:
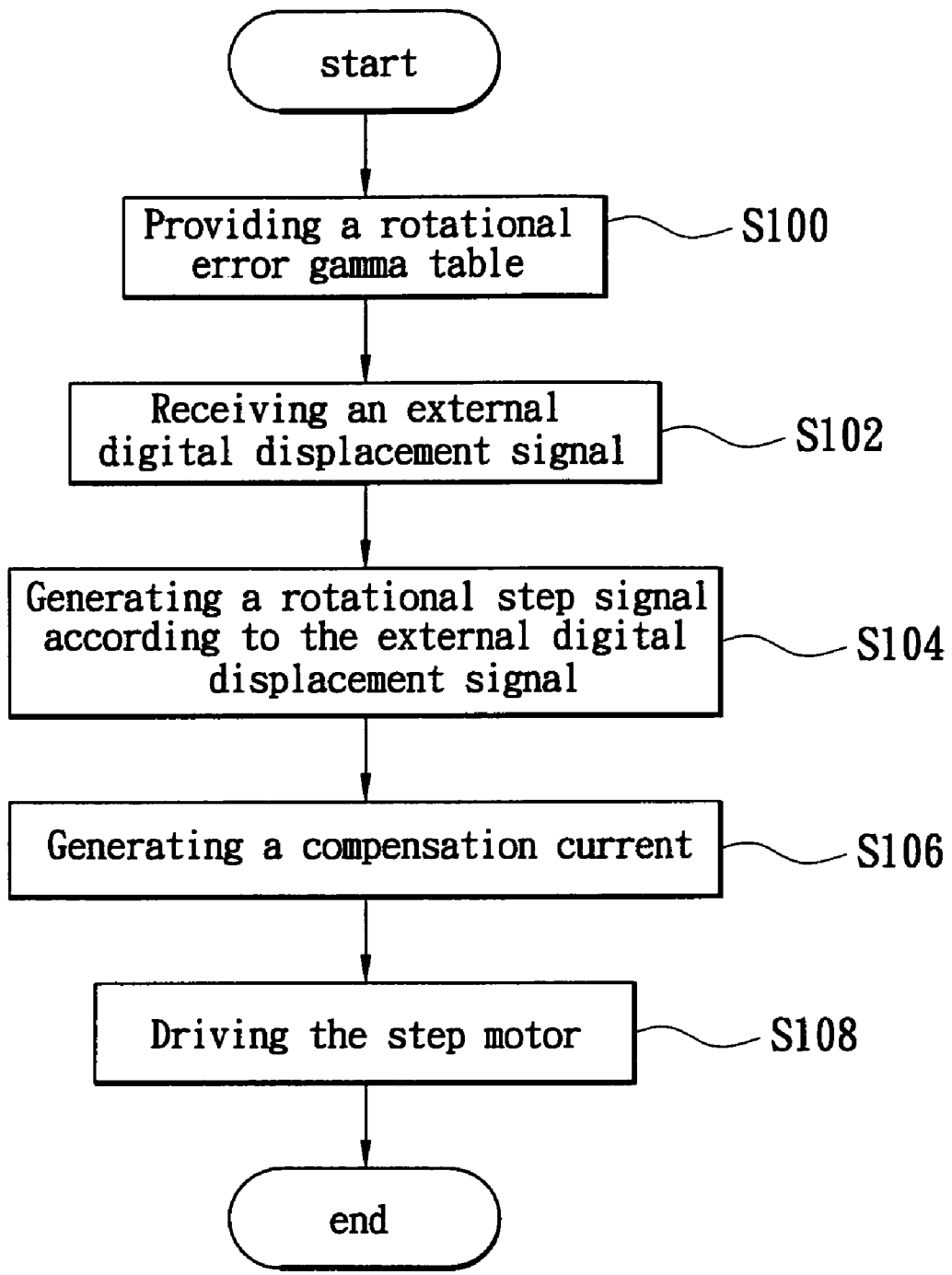
FIG. 4 shows the flowchart of an error-correction method for a step motor transmission system according to the present invention.

FIG. 4 shows the flowchart of an error-correction method for a step motor transmission system according to the present invention. First, an error value for each rotational step of the step motor is measured for the motor 10 for establishing a rotational error gamma table 222 and the rotational error gamma table 222 is stored in the error corrector 22 in step S100. The step number counter 24 receives a digital displacement signal 251 from the processor 25 through the error-correction apparatus 20 in step S102.

The step number counter 24 calculates the step number for the motor 10 according to the digital displacement signal 251 and outputs the step number to the rotational step controllers 23. The rotational step controllers 23 generate the rotational step signal 231 for outputting to the error corrector 22 in step S104.

The error corrector 22 then outputs a precise compensation current with reference to the rotational step signal 231 and the error value in the rotational error gamma table 222 in step S106. The precise compensation current drives the coils 11 in the motor 10 to rotate the internal shaft precisely in step S108.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An error-correction method for a step motor transmission system, the method used for a step motor having a plurality of inductor coils therein for rotating an internal shaft of the step motor and comprising the steps of:
  providing a rotational error gamma table by measuring an error value for each rotational step of the step motor;
  receiving an external digital displacement signal;
  calculating a step number for the step motor according to the digital displacement signal and generating a rotational step signal;
  outputting a compensation current according to the rotational step signal and an error value in the rotational error gamma table and driving the inductor coils by the compensation current to rotate the internal shaft.

2. The error-correction method for a step motor transmission system as in claim 1, wherein the rotational error gamma table is placed in an error corrector.

3. The error-correction method for a step motor transmission system as in claim 1, wherein in the step of receiving an external digital displacement signal, at least one rotational step controller is used to receive the external digital displacement signal.

4. The error-correction method for a step motor transmission system as in claim 1, wherein in the step of receiving an external digital displacement signal, the digital displacement signal is sent by an external processor.

5. The error-correction method for a step motor transmission system as in claim 1, wherein the step of calculating a step number for the step motor is executed by a step number counter.

6. The error-correction method for a step motor transmission system as in claim 1, wherein in the step of outputting a compensation current, an error corrector is used to obtain the error value in the rotational error gamma table.

7. The error-correction method for a step motor transmission system as in claim 1, wherein in the step of driving the inductor coils, a plurality of driving amplifiers are electrically connected to the inductor coils to rotate the internal shaft of the step motor.

8. An error-correction apparatus for a step motor transmission system, the apparatus used for a step motor having a plurality of inductor coils therein for rotating an internal shaft of the step motor and comprising:
  at least one driving amplifier electrically connected to the inductor coils to rotate the internal shaft of the step motor;
  at least one rotational step controller receiving an external digital displacement signal and converting the external digital displacement signal to a rotational step signal for the step motor; and
  an error corrector electrically connected between the driving amplifier and the rotational step controller and comprising a rotational error gamma table, the error corrector receiving the rotational step signal and modifying the rotational step signal according to the rotational error gamma table in order to drive the step motor transmission system by the driving amplifier.

9. The error-correction apparatus for a step motor transmission system as in claim 8, wherein the digital displacement signal is sent by an external processor.

10. The error-correction apparatus for a step motor transmission system as in claim 8, wherein the rotational step controller is connected to a step number counter for calculating a step number according to the digital displacement signal.

11. The error-correction apparatus for a step motor transmission system as in claim 8, wherein the rotational error gamma table is established by measuring an error value for each rotational step of the step motor.

12. The error-correction apparatus for a step motor transmission system as in claim 8, wherein the error corrector comprises a plurality of digital-to-analog converters for producing a compensation current according to the rotational step signal and an error value in the rotational error gamma table, the compensation current being sent to the driving amplifier for driving the step motor.

* * * * *